(12) United States Patent
He et al.

(10) Patent No.: US 9,009,356 B2
(45) Date of Patent: Apr. 14, 2015

(54) DATA OUTPUT METHOD AND APPARATUS

(75) Inventors: Zhiqiang He, Beijing (CN); Ying Liang, Beijing (CN); Xingwen Chen, Beijing (CN); Maolin Huang, Beijing (CN); Xiaojian Ding, Haidian District (CN); Jiangwei Zhong, Beijing (CN)

(73) Assignees: Beijing Lenovo Software Ltd. (CN); Lenovo (Beijing) Limited (CN)

( * ) Notice: Subject to any disclaimer, the term of this patent is extended or adjusted under 35 U.S.C. 154(b) by 386 days.

(21) Appl. No.: 12/317,492

(22) Filed: Dec. 23, 2008

(65) Prior Publication Data

US 2009/0177803 A1 Jul. 9, 2009

(30) Foreign Application Priority Data

Dec. 29, 2007 (CN) .......................... 2007 1 0308500

(51) Int. Cl.
*G06F 3/00* (2006.01)
*G06F 13/38* (2006.01)

(52) U.S. Cl.
CPC .................................. *G06F 13/385* (2013.01)

(58) Field of Classification Search
USPC ............................................................ 710/5
See application file for complete search history.

(56) References Cited

U.S. PATENT DOCUMENTS

| 7,152,171 | B2 * | 12/2006 | Chandley et al. | 713/320 |
| 2004/0021681 | A1 * | 2/2004 | Liao | 345/702 |
| 2004/0047344 | A1 * | 3/2004 | Chan et al. | 370/352 |
| 2004/0153537 | A1 * | 8/2004 | Rezvani et al. | 709/223 |
| 2005/0246469 | A1 * | 11/2005 | Chu | 710/301 |
| 2006/0031815 | A1 * | 2/2006 | Bhagia et al. | 717/106 |
| 2006/0114234 | A1 * | 6/2006 | Chiang | 345/168 |
| 2006/0200701 | A1 * | 9/2006 | Callender | 714/38 |

FOREIGN PATENT DOCUMENTS

CN 1694086 A 11/2005

* cited by examiner

*Primary Examiner* — Henry Tsai
*Assistant Examiner* — John Roche
(74) *Attorney, Agent, or Firm* — Schwegman Lundberg & Woessner, P.A.

(57) ABSTRACT

A data output method and apparatus according to the present invention, which are applicable in a data processing device comprising an output unit, a computer system and an embedded system, generate a control command for enabling an establishment of a channel for outputting data when it is determined that the computer system stays in a non-operating state, establish a data transmission channel between the embedded system and the output unit based on the control command, determine data to be outputted, and transfer the data to be outputted from the embedded system to the output unit through the data transmission channel. In this way, the method and apparatus according to the present invention can ensure that a user need not wait a long time for the computer's start-up, and can carry out an operation on local data for the computer in time, which improves the user satisfaction.

11 Claims, 3 Drawing Sheets

DATA OUTPUT METHOD AND APPARATUS

BACKGROUND OF THE INVENTION

1. Field of Invention

The present invention relates to the computer field, in particular to a data output method and apparatus.

2. Description of Prior Art

A certain period of time is needed for a computer to start up (being switched from a non-operating state into an operating state), and there is a period of at least 15-25 seconds before the computer completely logins and is operable by the user (the waiting period is mostly even longer due to computer performance and other factors). During this waiting period, the user can not carry out any operation on the computer, even very simple operations for local data, such as checking e-mails, address book and the like.

Obviously that start-up time of the current computer is too long and users can not carry out any operation for local data during this period, resulting in a reduced user satisfaction.

SUMMARY OF THE INVENTION

In view of this, an object of the present invention is to provide a data output method and apparatus, so as to ensure that an operation for local data may be carried out no matter whether the computer is started up or not, while improving the user satisfaction.

In order to achieve this, a technical solution of the present invention is implemented by a data output method and a data output apparatus.

The data output method is applicable in a data processing device comprising an output unit, a computer system and an embedded system, comprising the steps of:

generating a control command for enabling an establishment of a channel for outputting data, when it is determined that the computer system stays in a non-operating state;

establishing a data transmission channel between the embedded system and the output unit based on the control command;

determining data to be outputted; and transferring the data to be outputted from the embedded system to the output unit through the data transmission channel.

The step of establishing the data transmission channel between the embedded system and the output unit based on the control command comprises:

sending an operation right switching command to the embedded system;

at the embedded system, determining that an operation right for local data of the computer system is to be held by itself after receiving the operation right switching command; and switching a channel, through which a User Interface Unit is originally connected to the computer system, to be connected to the embedded system.

Alternatively, the step of establishing the data transmission channel between the embedded system and the output unit based on the control command comprises:

sending an operation right switching command to the embedded system;

at the embedded system, determining that an operation right for local data of the computer system is to be held by itself after receiving the operation right switching command; receiving operation information sent from a User Interface Unit, which is provided in the embedded system; and disconnecting a User Interface unit in the computer system.

Before establishing a data transmission channel between the computer system and the output unit based on the control command, the method further comprises a step of synchronizing an operation result for local data in the computer system into the embedded system.

Furthermore, the method further comprises a step of establishing a data transmission channel between the computer system and the output unit based on the control command, and this step particularly comprises:

at the computer system, sending an operation right switching command to the embedded system; at the embedded system, determining that an operation right for local data of the computer system is no longer to be held by itself after receiving the operation right switching command; and switching a channel, through which a User Interface unit is originally connected to the embedded system, to be connected to the computer system.

The method further comprises a step of synchronizing an operation result for local data in the embedded system into the computer system when the computer system is switched from the non-operating state into the operating state.

The data output apparatus comprises a computer system, an embedded system that carries out an operation for local data in stead of the computer system, and an Interface Switch; wherein, the computer system is adapted to generate a control command for enabling an establishment of a channel for outputting data when the computer system determines that it stays in the non-operating state;

the Interface Switch is adapted to establish a data transmission channel between the embedded system and an output unit connected therewith based on the control command;

the embedded system is adapted to transfer data to be outputted to the output unit through the established data transmission channel.

The computer system comprises an embedded controller EC and a User Interface unit, both of which are connected to the Interface Switch. The embedded system comprises an application processor AP. When the computer is switched from an operating state into the non-operating state, the EC is adapted to send the control command to the embedded system and to send a switch command to the Interface Switch;

the AP is adapted to determine that an operation right for local data of the computer system is to be held by itself after receiving the control command; and the Interface Switch is adapted to switch a channel, through which the User Interface is originally connected to the EC, to be connected to the AP.

Alternatively, the computer system comprises an EC and a first User Interface Unit, both of which are connected to the Interface Switch. The embedded system comprises an AP and a second User Interface Unit, which are connected with each other; wherein when the computer system is switched from the operating state into the non-operating state, the EC is adapted to send the control command to the embedded system and to send a switch command to the Interface Switch;

the AP is adapted to determine that an operation right for local data of the computer system is to be held by itself after receiving the control command, and to receive operation information from the second User Interface Unit; and the Interface Switch is adapted to disconnect the first User Interface from the EC when receiving the switch command.

Alternatively, the computer system comprises an EC and a User Interface Unit, both of which are connected to the Interface Switch. The embedded system comprises an AP. When the computer system is switched from the non-operating state into the operating state, the EC is adapted to send the control command to the embedded system, and to send a switch command to the Interface Switch;

the AP is adapted to determine that an operation right for local data of the computer system is no longer to be held by itself after receiving the control command; and the Interface Switch is adapted to switch a channel, through which the User Interface is originally connected to the AP, to be connected to the EC.

The output unit is a display unit.

In this way, the data output method and apparatus according to the present invention are applicable in a data processing device comprising an output unit, a computer system and an embedded system. The apparatus generates a control command for enabling an establishment of a channel for outputting data when it is determined that the computer system stays in the non-operating state, establishes a data transmission channel between the embedded system and the output unit based on the control command, determines data to be outputted, and transfers the data to be outputted from the embedded system to the output unit through the data transmission channel. In this way, the method and apparatus according to the present invention can ensure that a user need not wait for a long time for the computer to start-up even, and can carry out an operation on local data for the computer in time, which can improve the user satisfaction.

DETAILED DESCRIPTION OF PREFERRED EMBODIMENTS

The present invention will be described in detail below, in combination with the drawings.

A data output method according to the present invention is applied in a data processing device comprising an output unit, a computer system and an embedded system. The method comprises generating a control command for enabling an establishment of a channel for outputting data when it is determined that the computer system stays in a non-operating state; establishing a data transmission channel between the embedded system and the output unit based on the control command; determining data to be outputted; and transferring the data to be outputted from the embedded system to the output unit through the data transmission channel.

A data output apparatus according to the present invention comprises a computer system, an embedded system that carries out an operation for local data instead of the computer system, and an Interface Switch. The computer system is adapted to generate a control command for enabling an establishment of a channel for outputting data when the computer system determines that it stays in a non-operating state. The Interface Switch is adapted to establish a data transmission channel between the embedded system and an output unit connected therewith based on the control command. The embedded system is adapted to transfer data to be outputted to the output unit through the established data transmission channel.

Figure 1:
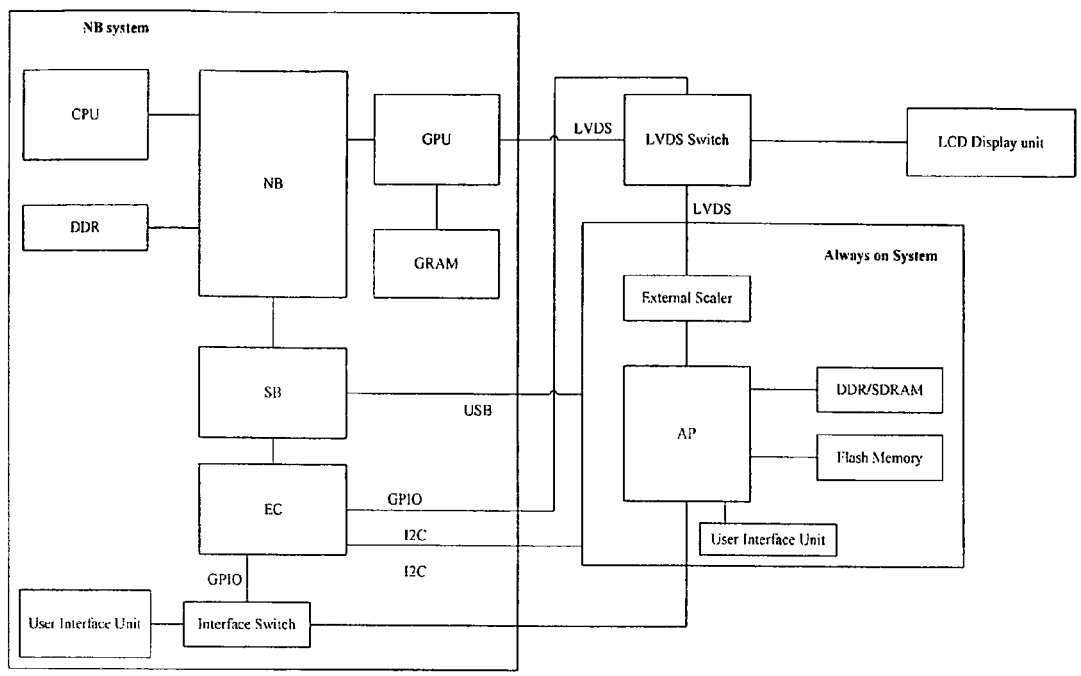
FIG. 1 is a block diagram for implementing an operation right switching for local data according to one embodiment of the present invention.

Referring to FIG. 1, a block diagram for implementing an operation right switching for local data according to one embodiment of the present invention is shown. In FIG. 1, besides a LCD Display Unit currently provided in the computer, a LVDS Switch (which is also referred as a display change-over switch) and an Always On System, both of which are connected with each other, are newly provided therein, the Always On system being in a form of an embedded system. In particular, the Always On System includes an AP, an External Scaler connected to the AP, a DDR/SDRAM and a Flash Memory.

The External Scaler is connected to the LVDS switch, which is further connected to a GPU, a LCD Display Unit and an EC of the computer system, respectively. The EC is also connected to the Always On System. Moreover, a South Bridge (SB) chip connected to the EC is further connected to the Always On System.

Moreover, an Interface Switch is newly provided in such a way that the Interface Switch is connected to the EC and the AP, respectively. Moreover, a User Interface Unit may be also provided in the computer and/or the Always On System.

It should be noted that a power supply module (not shown in FIG. 1) is also arranged in the computer for supplying power to the NB system and the Always On System.

In a specific application, the EC notifies the AP of performing data synchronization via a GPIO interface when the computer is to be switched into the non-operating state. The AP acquires an operation result for local data from the DDR and other memories in the computer, and sends the required operation result to the Flash Memory and the like in the Always On System for storage.

Obviously, a SB chip may be used to notify the AP of performing data synchronization via a USB connection. After receiving a data synchronization notification from the SB, the AP acquires an operation result for local data from the DDR and the like in the computer, and sends the acquired operation result to the Flash Memory and the like in the Always On System for storage.

When the computer stays in the non-operating state, the power supply module is still supplying power to the EC, which then switches an operation right for local data of the computer to the AP of the Always On System. There are a variety of switching methods.

In a first switching method, the EC sends an operation right switching command to the Always On System via a 2-wire serial bus ($I^2C$), the AP of the Always On System determines that an operation right for local data of the computer is to be held by itself after receiving the operation right switching command; and the EC sends a switch command to the Interface Switch via a GIPO interface, then the Interface Switch switches a channel, through which a User Interface Unit of the NB system is originally connected to the EC, to be connected to the AP when receiving the switch command, so that a destination for the operation information sent from the User Interface Unit is switched to the AP from the EC; and In a second switching method, the EC sends an operation right switching command to the Always On System via a $I^2C$ and the like, the AP of the Always On System determines that an operation right for local data of the computer is to be held by itself after receiving the operation right switching command, thereby receives operation information from a User Interface Unit provided in the Always On System; and the EC sends a switch command to the Interface Switch via a GIPO interface, then the Interface Switch disconnects a channel that is originally connected to the EC after receiving the switch command, so that the operation information sent from the User Interface Unit can not arrive at the EC.

The AP receives the operation information for the computer when the operation right for local data of the computer is switched to the AP of the Always On System, and performs an operation on local data according to the received operation information. Obviously, the AP may also send a result of the operation to the Flash Memory and the like for storage.

In order to facilitate operations for local data, the local display right of the computer may also be switched to the Always On System. There are a variety methods for switching the local display right. For example, the EC sends a switch command to the LVDS Switch via a GPIO interface, then the LVDS Switch switches a channel that is originally connected to the GPU to the External Scaler after receiving the switch command, so that video information sent from the GPU can not arrive at the LCD Display Unit, while video information generated by the AP, such as an operation result for local data, can successfully arrive at the LCD Display Unit.

The AP sends the video information to the LCD Display Unit via the External Scaler and LVDS Switch after the local display right of the computer being switched to the Always On System, thereby the LCD Display Unit can process and display video information from the AP.

When the computer stays in the non-operating state, it can be switched into the operating state due to the start-up and other factors. The AP notifies the EC of performing data synchronization via the GPIO interface during a process in which the computer is switched from the non-operating state into the operating state. After receiving a data synchronization notification from the AP, the EC acquires an operation result for local data from the Flash Memory and the like in the Always On System, and sends the acquired operation result to the DDR and the like in the computer.

Obviously, the AP may also notify the SB chip of performing data synchronization via a USB connection. After receiving a data synchronization notification from the AP, the SB acquires an operation result for local data from the Flash Memory and the like in the computer, and sends the acquired operation result to the DDR and the like in the computer.

When the computer finally stays in the operating state, the operation right for the local data of the computer is switched to the EC. There are a variety of methods for switching. As an example, the EC sends an operation right switching command to the Always On System via a I$^2$C and the like, the AP of the Always On System determines that an operation right for local data of the computer is no longer to be held by itself after receiving the operation right switching command; moreover, the EC sends a switch command to the Interface Switch via the GIPO interface, then the Interface Switch switches a channel, through which a User Interface Unit of the NB system is originally connected to the AP, to be connected to the EC when receiving the switch command, such that a destination for the operation information sent from the User Interface Unit is switched to the EC from the AP.

Obviously, if the AP is further connected to other User Interface Units, it may further determine that it no longer receives operation information sent from these User Interface Units.

The EC receives the operation information for the computer after the operation right for local data of the computer being switched to the EC, and performs an operation for local data according to the received operation information.

In order to facilitate operations for local data, the local display right of the computer may be also switched to the LVDS Switch. There are a variety methods for switching the local display right. For example, the EC sends a switch command to the LVDS Switch via the GPIO interface, then the LVDS Switch switches a channel that is originally connected to the External Scaler to be connected to the GPU after receiving the switch command, such that video information sent from the External Scaler can not arrive at the LCD Display Unit, while video information sent by the GPU, such as an operation result for local data, can successfully arrive at the LCD Display Unit.

The EC sends the video information to the LCD Display Unit via the GPU after the local display right of the computer being switched to the EC, thereby the LCD Display Unit can process and display video information from the EC.

In a practice application, an apparatus, which can trigger the operation right switching for local data and the local display right switching, may not necessarily be the computer, it may also be other apparatus such as an AP that can detect state changes of the computer.

It can be seen from the above description of FIG. 1, since an auxiliary executive system that can perform an operation for local data instead of the computer is provided, an operation right for local data may be switched to the auxiliary executive system, by which an operation for local data will be carried out, when the computer is switched from the operating state into the non-operating state; and the operation right for local data may be switched to the computer, by which an operation for local data will be carried out, when the computer is switched from the non-operating state into the operating state. Such an operation manner ensures that the user is unnecessary to wait a longer time for the computer's start-up to carry out an operation on local data for the computer even during the start-up of the computer, which effectively improves the user satisfaction.

Figure 2:
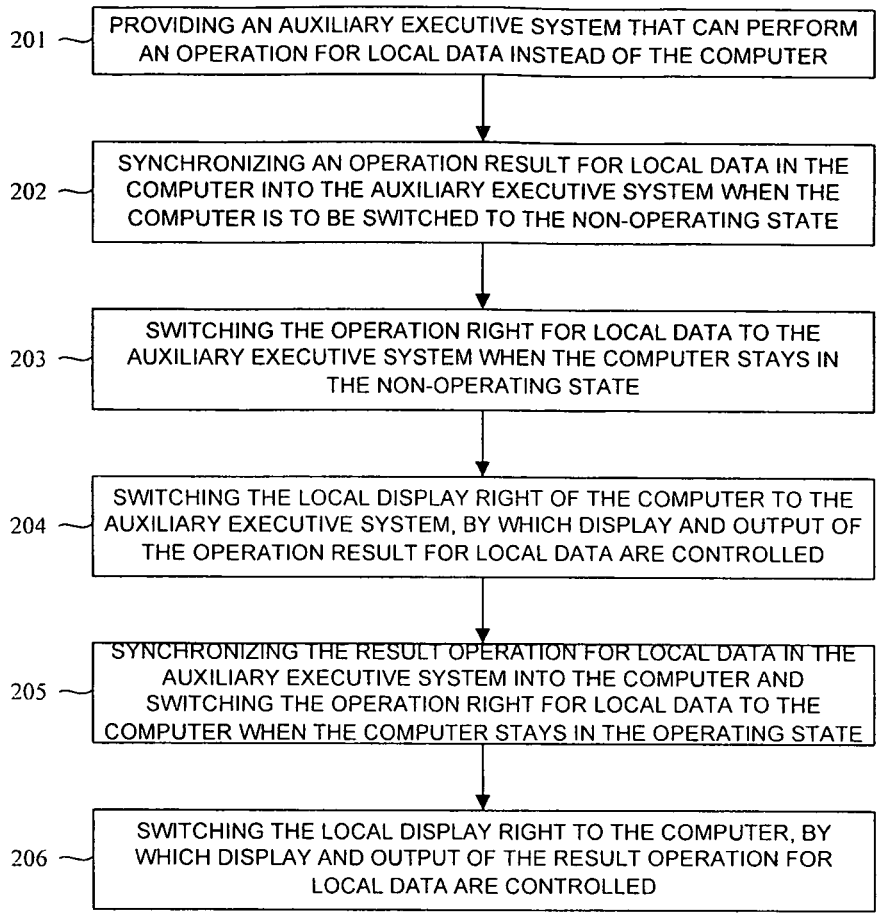
FIG. 2 is a flowchart for implementing an operation right switching for local data according to one embodiment of the present invention.

If the description for FIG. 1 is expressed in a flowchart, it is shown as FIG. 2. Referring to FIG. 2, a flowchart for implementing an operation right switching for local data according to one embodiment of the present invention is shown, which comprises:

step 201 of providing an auxiliary executive system that can perform an operation for local data instead of the computer;

step 202 of synchronizing an operation result for local data in the computer into the auxiliary executive system when the computer is to be switched to the non-operating state;

step 203 of switching the operation right for local data to the auxiliary executive system when the computer stays in the non-operating state, the operation for local data being performed by an AP in the auxiliary executive system;

step 204 of switching the local display right of the computer to the auxiliary executive system, display and output of the operation result for local data being controlled by the auxiliary executive system;

step 205 of synchronizing the result operation for local data in the auxiliary executive system into the computer and switching the operation right for local data to the computer when the computer stays in the operating state; and step 206 of switching the local display right to the computer, display and output of the result operation for local data being controlled by the computer.

Figure 3:
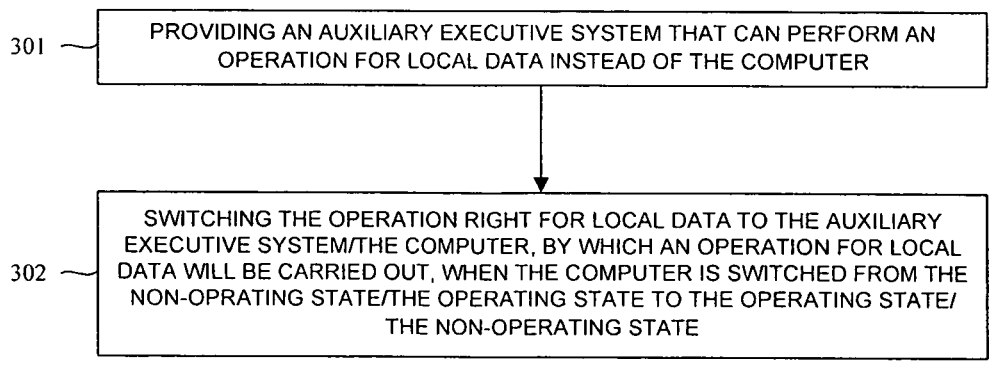
FIG. 3 is a simplified flowchart for implementing an operation right switching for local data according to the present invention.

It can be seen from FIGS. 1 and 2, general steps for implementing the operating right switching for local data are shown in FIG. 3, which is a simplified flowchart for implementing the operation right switching for local data according to the present invention, which comprises the following steps:

step 301 of providing an auxiliary executive system that can perform an operation for local data instead of the computer; and step 302 of switching the operation right for local data to the auxiliary executive system/the computer, by which an operation for local data will be carried out, when the computer is switched from the non-operating state/the operating state to the operating state/the non-operating state.

Figure 4:
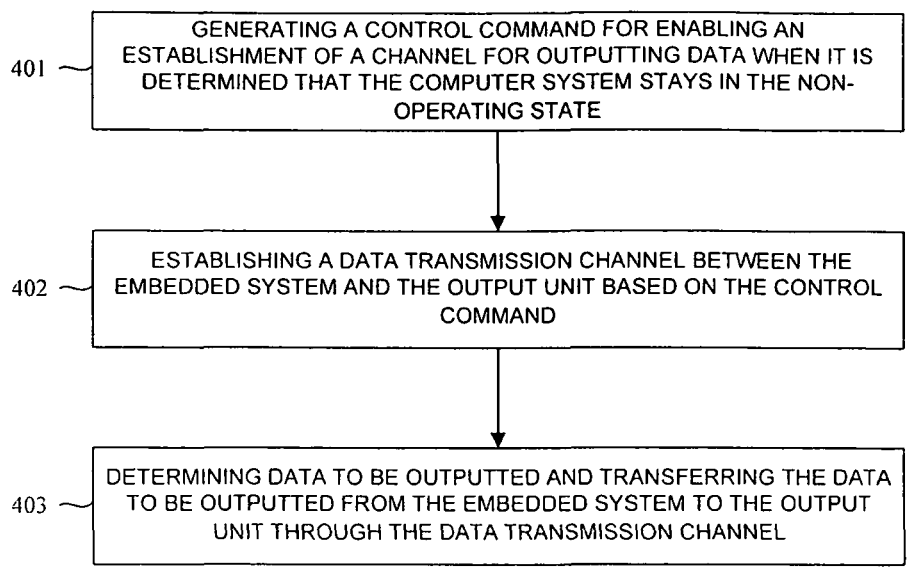
FIG. 4 is another simplified flowchart for implementing an operation right switching for local data according to the present invention.

As described above, it can be seen that critical steps of embodiments of the present invention are as shown in FIG. 4. Referring to FIG. 4, another simplified flowchart for implementing an operation right switching for local data according to the present invention, in which the following steps are comprised:

step 401 of generating a control command for enabling an establishment of a channel for outputting data when it is determined that the computer system stays in the non-operating state;

step 402 of establishing a data transmission channel between the embedded system and the output unit based on the control command; and step 403 of determining data to be outputted and transferring the data to be outputted from the embedded system to the output unit through the data transmission channel.

In this way, the data output method and apparatus according to the present invention, which are applicable in a data processing device comprising an output unit, a computer system and an embedded system, generate a control command for enabling an establishment of a data transmission channel when it is determined that the computer system stays in the non-operating state, establish a data transmission channel between the embedded system and the output unit based on the control command, determine data to be outputted, and transfer the data to be outputted from the embedded system to the output unit through the data transmission channel. The method and apparatus according to the present invention can ensure that a user need not wait a long time for the computer's start-up, and can carry out an operation for local data for the computer in time, which improves the user satisfaction significantly.

What is claimed is:

1. A data output method, which is applicable in a data processing device comprising an output unit, a computer system and an embedded system, wherein the computer system comprises an embedded controller (EC), and the embedded system is configured to perform an operation on local data instead of the computer system, and wherein a state of the computer system is independent of the embedded system, said method comprising:

when it is determined that the computer system stays in a non-operating state:

sending, by the EC in the computer system, an operation right switching command to the embedded system;

determining, at the embedded system, that an operation right for local data of the computer system is to be held by itself after receiving the operation right switching command;

receiving, at the embedded system, operation information for the data processing device, and performing an operation on the local data according to the received operation information;

establishing a data transmission channel between the embedded system and the output unit based on the operation right switching command;

determining data to be outputted; and transferring the data to be outputted from the embedded system to the output unit through the data transmission channel, and when the computer system is switched from the non-operating state into an operating state:

holding, by the embedded system, the operation right for local data of the computer system;

when the computer system finally stays in the operating state:

sending, by the EC in the computer system, an operation right switching command to the embedded system;

determining, by the embedded system, that an operation right for local data of the computer system is no longer to be held by itself after receiving the operation right switching command;

performing an operation on the local data according to the received operation information by the computer system; and switching the output unit to be connected to the computer system, wherein when the operation right for local data of the computer system is switched to the embedded system, the local display right of the computer system is switched to the embedded system by switching a channel that is connected to a GPU of the computer system to an External Scaler of the embedded system, and the video information is sent to the output unit via the External Scaler and a LVDS Switch connected to the embedded system, and wherein when the operation right for local data of the computer system is switched to the computer system, the local display right of the computer system is switched to the computer system by switching a channel that is connected to the External Scaler to the GPU, and the video information is sent to the output unit via the GPU.

2. The method according to claim 1, wherein establishing the data transmission channel between the embedded system and the output unit based on the operation right switching command comprises:

switching a channel, through which a User Interface Unit is originally connected with the computer system, to be connected to the embedded system; or receiving operation information sent from a User Interface Unit, which is provided in the embedded system; and disconnecting a User Interface unit in the computer system.

3. A data output apparatus comprising a computer system, an embedded system configured to carry out an operation on local data instead of the computer system and an Interface Switch, the computer system comprises an embedded controller (EC), wherein a state of the computer system is independent of the embedded system, and wherein when the computer system determines that it stays in a non-operating state:

the EC in the computer system is configured to send an operation right switching command to the embedded system when the computer system determines that it stays in a non-operating state;

the embedded system is configured to determine that an operation right for local data of the computer system is to be held by itself after receiving the operation right switching command, receive operation information, and perform an operation on the local data according to the received operation information;

the Interface Switch is configured to establish a data transmission channel between the embedded system and an output unit connected therewith, based on the operation right switching command; and the embedded system is configured to transfer data to be outputted to the output unit through the established data transmission channel, when the computer system is switched from the non-operating state into an operating state, the embedded system holds the operation right for local data of the computer system; and when the computer system finally stays in the operating state, the EC in the computer system sends an operation right switching command to the embedded system;

the embedded system determines that an operation right for local data of the computer system is no longer to be held by itself after receiving the operation right switching command;

the computer system performs an operation on the local data according to the received operation information; and the Interface Switch switches the output unit to be connected to the computer system, wherein when the operation right for local data of the computer system is switched to the embedded system, the local display right of the computer system is switched to the embedded system by switching a channel that is connected to a GPU of the computer system to an External Scaler of the embedded system, and the video information is sent to the output unit via the External Scaler and a LVDS Switch connected to the embedded system, and wherein when the operation right for local data of the computer system is switched to the computer system, the local display right of the computer system is switched to the computer system by switching a channel that is connected to the External Scaler to the GPU, and the video information is sent to the output unit via the GPU.

4. The apparatus according to claim 3, wherein the computer system further comprises a User Interface unit, both the EC and the User Interface unit are connected to the Interface Switch, and the embedded system comprises an application processor AP; when the computer is switched from an operating state into the non-operating state, the EC is configured to send the operation right switching command to the embedded system and to send a switch command to the Interface Switch; the AP is configured to determine that an operation right for local data of the computer system is to be held by itself after receiving the control command; and the Interface Switch is configured to switch a channel, through which the User Interface is originally connected to the EC, to be connected to the AP.

5. The apparatus according to claim 3, wherein the computer system further comprises a first User Interface Unit, both the EC and the User Interface unit are connected to the Interface Switch, and the embedded system comprises an AP and a second User Interface Unit, both of which are connected with each other; when the computer system is switched from an operating state into the non-operating state, the EC is configured to send the operation right switching command to the embedded system and to send a switch command to the Interface Switch; the AP is configured to determine that an operation right for local data of the computer system is to be held by itself after receiving the control command and to receive operation information from the second User Interface Unit; and the Interface Switch is configured to disconnect the first User Interface from the EC when receiving the switch command.

6. The apparatus according to claim 3, wherein the computer system further comprises a User Interface Unit, both the EC and the User Interface unit are connected to the Interface Switch, and the embedded system comprises an AP, when the computer system is switched from the non-operating state into an operating state, the EC is configured to send the operation right switching command to the embedded system and to send a switch command to the Interface Switch; the AP is configured to determine that an operation right for local data of the computer system is no longer to be held by itself after receiving the control command; and the Interface Switch is configured to switch a channel, through which the User Interface is originally connected to the AP, to be connected to the EC.

7. The apparatus according to anyone of claims 3-6, wherein the output unit is a display unit.

8. The method according to claim 1, wherein
when the computer system is switched from the operating state into the non-operating state,
synchronizing an operation result for local data in the computer system into the embedded system; and
when the computer system is switched from the non-operating state into an operating state,
synchronizing an operation result for local data in the embedded system into the computer system.

9. The method according to claim 1, wherein the EC in the computer system connects to a South Bridge (SB) chip in the computer system, to a LVDS Switch which is connected to the embedded system, to a Interface Switch which is connected to the embedded system, and to the embedded system via a GPIO.

10. The apparatus according to claim 3, wherein
when the computer system is switched from the operating state into the non-operating state,
the computer system synchronizes an operation result for local data in the computer system into the embedded system; and
when the computer system is switched from the non-operating state into an operating state,
the embedded system synchronizes an operation result for local data in the embedded system into the computer system.

11. The apparatus according to claim 3, wherein the EC in the computer system connects to a South Bridge (SB) chip in the computer system, to a LVDS Switch which is connected to the embedded system, to a Interface Switch which is connected to the embedded system, and to the embedded system via a GPIO.

* * * * *